(12) United States Patent
Byrne

(10) Patent No.: US 6,424,251 B1
(45) Date of Patent: Jul. 23, 2002

(54) PERSONAL ELECTRONIC DEVICE NOTIFICATION SYSTEM

(76) Inventor: Matthew T. Byrne, 155 E. 31st St., Apt. 16A, New York, NY (US) 10016

( * ) Notice: Subject to any disclaimer, the term of this patent is extended or adjusted under 35 U.S.C. 154(b) by 0 days.

(21) Appl. No.: 09/709,844

(22) Filed: Nov. 10, 2000

Related U.S. Application Data
(60) Provisional application No. 60/164,580, filed on Nov. 10, 1999.

(51) Int. Cl.[7] .................................................. H04Q 1/30
(52) U.S. Cl. ................... 340/311.1; 340/407.1; 340/825.19; 455/567
(58) Field of Search .......................... 340/311.1, 407.1, 340/825.19; 455/66, 96, 567

(56) References Cited

U.S. PATENT DOCUMENTS

| | | | | |
|---|---|---|---|---|
| 5,722,071 A | * | 2/1998 | Berg et al. | 340/407.1 |
| 5,896,096 A | * | 4/1999 | Kim | 340/407.1 |
| 5,960,367 A | * | 9/1999 | Kita | 455/567 |
| 6,181,237 B1 | * | 1/2001 | Gehlot | 340/407.1 |
| 6,184,796 B1 | * | 2/2001 | Rivero et al. | 340/825.44 |
| 6,218,958 B1 | * | 4/2001 | Eichstaedt et al. | 340/407.1 |

* cited by examiner

Primary Examiner—John Tweel

(57) ABSTRACT

Systems and methods for alerting users of personal electronic devices are provided. In a first aspect of the invention, these systems and methods alert a user to the occurrence of an event in one or more of the devices by receiving a wireless transmission from the device(s) and then by providing an acoustic, optical, electrical, or mechanical stimulus to the user. In a second aspect of the invention, these systems and methods may also provide a quiet mode control mechanism through which personal electronic devices are automatically put into a low volume or silent alert operation mode so as not to disturb persons in the vicinity of the devices. This control mechanism may use a wireless transmitter to transmit a signal to any personal electronic device within a given area.

5 Claims, 3 Drawing Sheets

PERSONAL ELECTRONIC DEVICE NOTIFICATION SYSTEM

CROSS REFERENCE TO RELATED APPLICATION

This application claims the benefit of U.S. Provisional Patent Application No. 60/164,580, filed Nov. 10, 1999, which is hereby incorporated by reference herein in its entirety.

BACKGROUND OF THE INVENTION

The present invention is systems and methods for alerting users of personal electronic devices to the occurrence of an event on one or more of those electronic devices.

In recent years, the use of a wide variety of personal electronic devices has achieved immense popularity. These devices include portable telephones, pagers, portable and hand-held email systems, palm-top or portable computers, and many other similar devices. When using each of these devices, there may be times when it is desirable to alert the user of the occurrence of an event. For example, with a portable telephone (e.g., a cellular telephone), it may be desirable to alert the user that a call is being received. As another example, with a pager, it may be desirable to alert the user to the receipt of a page.

With most or all of these devices, the user may typically be alerted to the occurrence of an event using an audible tone or series of tones, such as a ring, beep, etc. Unfortunately, however, these sounds are frequently found to be objectionable to persons in the vicinity of the user, especially when in environments such as restaurants, movie theaters, certain sporting events (such as golf and tennis events), trains, busses, libraries, etc.

Similarly, when in loud environments, these audible alerts might not be heard by the user. Such loud environments may include restaurants, bars, clubs, musical concerts, crowded sidewalks, automobiles, sporting events, etc.

To overcome these problems with audible alerts, many devices include a vibration alert that causes the device to vibrate when an alert is necessary. However, when the user is not wearing the device or in direct contact with the device (such as when the device is in a brief case, purse, backpack, or when the user has set aside the device), the alert may not be felt.

Therefore, it is an object of the invention to provide systems and methods for alerting a user of one or more personal electronic devices to the occurrence of an event relating to one or more of those devices.

It is also an object of the invention, to provide a mechanism for automatically placing personal electronic devices into a quiet mode in order to prevent the devices from disturbing persons near the devices.

SUMMARY OF THE INVENTION

In accordance with these and other objects of the present invention, systems and methods for alerting users of personal electronic devices are provided. In a first aspect of the invention, these systems and methods alert a user to the occurrence of an event in one or more of the devices by receiving a wireless transmission from the device(s) and then by providing an acoustic, optical, electrical, or mechanical stimulus to the user. In a second aspect of the invention, these systems and methods may also provide a quiet mode control mechanism through which personal electronic devices are automatically put into a low volume or silent alert operation mode so as to not disturb persons in the vicinity of the devices. This control mechanism may use a wireless transmitter to transmit a signal to any personal electronic device within a given area.

BRIEF DESCRIPTION OF THE DRAWINGS

Further features of the invention, its nature and various advantages will be more apparent from the following detailed description of the preferred embodiments, taken in conjunction with the accompanying drawings, in which like reference characters refer to like parts throughout, and in which.

DETAILED DESCRIPTION OF THE PREFERRED EMBODIMENTS

Figure 1:
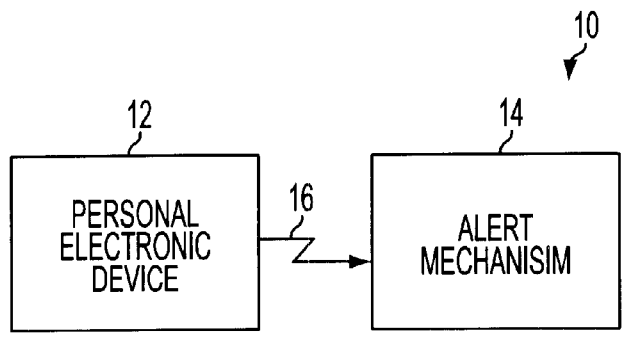
FIG. 1 is a block diagram of a personal electronic device and an alert mechanism in accordance with an embodiment of the present invention.

Turning to FIG. 1, an illustrative embodiment 10 of the first aspect of the present invention is shown. As can be seen, embodiment 10 includes a personal electronic device 12 and an alert mechanism 14. In order to cause an alert to be generated by alert mechanism 14, device 12 preferably transmits signal 16 to mechanism 14. Signal 16 may also be used to convey information present in device 12 to mechanism 14.

Figure 2:
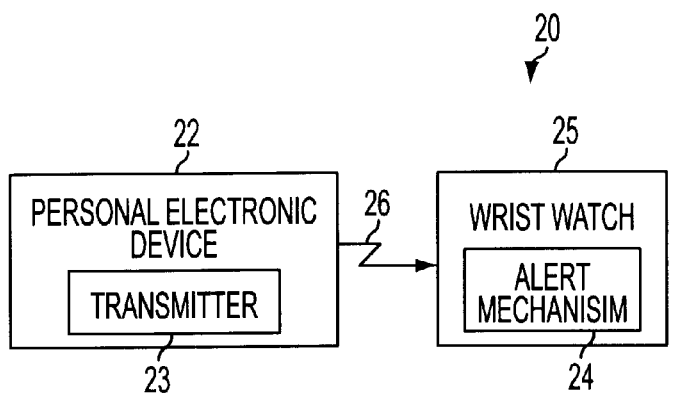
FIG. 2 is a more detailed block diagram of a personal electronic device and an alert mechanism in accordance with an embodiment of the present invention.

FIG. 2 shows a more detailed embodiment 20 of the first aspect of the present invention. As illustrated, personal electronic device 22 may comprise a transmitter 23. Transmitter 23 may transmit a signal 26 to a wrist watch 25 that contains an alert mechanism 24. When signal 26 is received by alert mechanism 24, the mechanism may indicate to the user that an event has occurred in personal electronic device 22. Transmitter 23 may be configured to identify the personal electronic device having the event (such as the user's phone), identify the type of event on the device (such as that fact that the phone is ringing or the phone's battery is low), and identify particulars of the event (such as the telephone number or the phone's battery level).

Although a wrist watch 25 is shown in FIG. 2, alert mechanism 24 may be incorporated into any item that is frequently worn by, near, or in contract with the body of the user of one or more electronic devices. This item may include a belt, a hearing aid, a piece of jewelry, an article of clothing, a hat or helmet, footwear, glasses, a key chain, or any other suitable device. Alternatively, alert mechanism 24 may be a stand-alone device that is not incorporated into another device. To notify the user of the occurrence of an event, alert mechanism 24 may contain a vibration unit, an audible unit, an electrical stimulus unit, an optical alert unit, or any other suitable mechanism for getting the user's attention. Signal 26 may be transmitted using any suitable wireless transmission technology, and may be encoded to include information about the event, such as the device transmitting the signal (such as a phone), the nature of the event (such as that the phone is ringing), and particulars of the event (such as a phone number causing the phone to ring).

Figure 3:
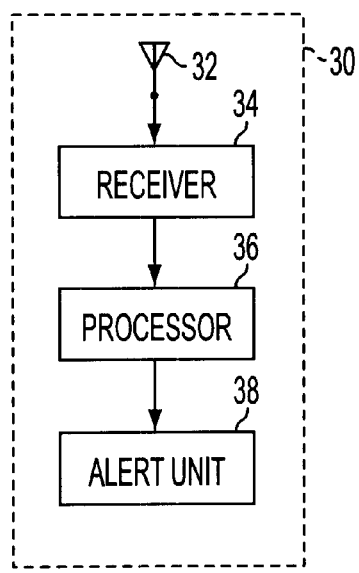
FIG. 3 is a block diagram of an alert mechanism in accordance with an embodiment of the present invention.

FIG. 3 illustrates one embodiment of an alert mechanism 30 in accordance with the present invention. As shown, alert mechanism 30 may include an antenna 32, a wireless receiver 34, a processor 36, and an alert unit 38. Alert unit 38 may contain a vibration unit and an optical indicator, although not shown. Wireless receiver 34 preferably operates to receive a low power radio signal. In this way, mechanism 30 can contain the smallest battery possible. Alert mechanism 30 is preferably configured so that the vibration unit is located in close proximity to the user's skin, and the optical indicator is preferably a liquid crystal display that can be viewed by the user.

Figure 4:
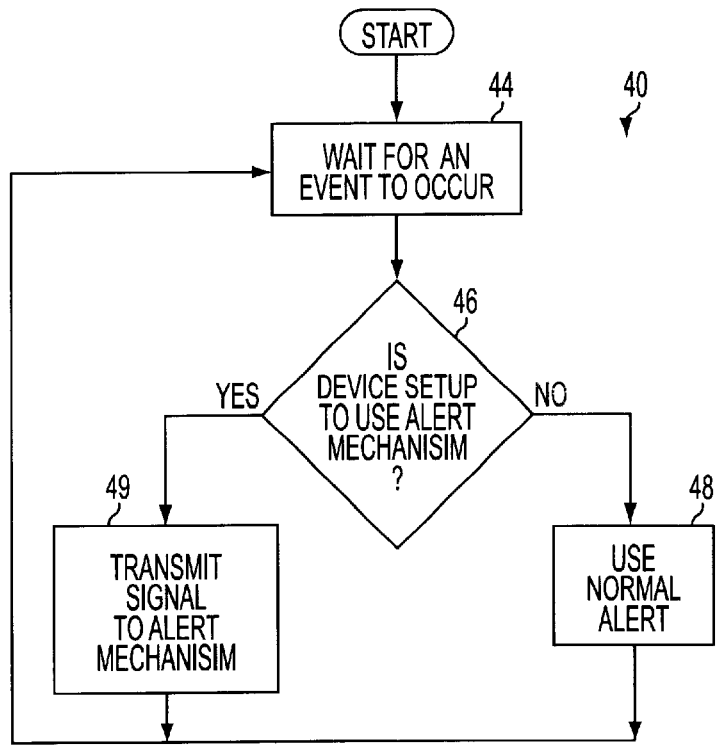
FIG. 4 is a flow diagram of a process for a personal electronic device in accordance with an embodiment of the present invention.

Turning to FIG. 4, a process 40 for operation in a personal electronic device is illustrated. As shown, when an event occurs in the personal electronic device at step 44, the device determines whether the device is setup to use an alert mechanism. Whether the device is setup may be based upon a setting in a configuration of the personal electronic device. If the device is not setup to use an alert mechanism, the device may use a normal alert (such as generating a tone or vibrating) at step 48. Otherwise, the device may trigger the transmitter to transmit a signal to the receiver in the alert mechanism to indicate that the event occurred, and the nature and particulars of the event, if so configured, at step 49. The receiver in the alert mechanism may then receive the signal and cause the vibration unit to vibrate, and the optical indicator to indicate the nature and particulars of the event, if so configured.

Because the alert mechanism may be in the proximity of personal electronic devices of other persons, the alert mechanism's receiver is preferably configurable to only alert the user to signals received from the user's personal electronic devices, or the transmitter in the user's personal electronic devices may be configurable to transmit to only the receiver in the user's alert mechanism. For example, the receiver in the user's alert mechanism may be assigned a unique serial number (e.g., a combination of a manufacturer code and a manufacturer's serial number) to which each of the user's personal electronic devices have to be programmed so that they only transmit a signal to that device. Alternatively, the user's alert mechanism may be programmed to only respond to signals from personal electronic devices having unique serial numbers programmed into the alert mechanism.

Figure 5:
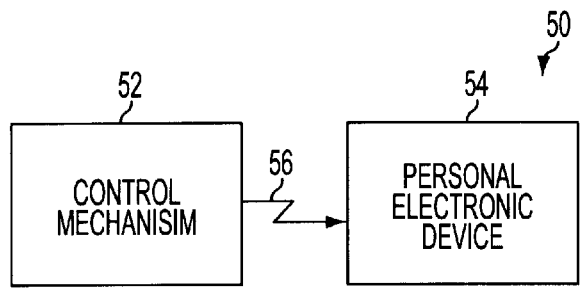
FIG. 5 is a block diagram of a control mechanism and a personal electronic device in accordance with an embodiment of the present invention.
Figure 6:
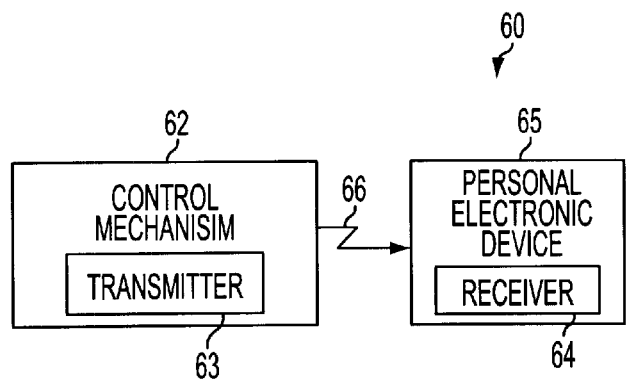
FIG. 6 is a more detailed block diagram of a control mechanism and a personal electronic device in accordance with an embodiment of the present invention.

Turning to FIG. 5, an embodiment 50 of the present invention in accordance with the second aspect of the invention is shown. As shown, a quiet mode control mechanism 52 is provided through which personal electronic devices 54 may automatically be put into a low volume or silent alert operation mode so as not to disturb persons in the vicinity of the devices. This may be done by transmitting a signal 56 from mechanism 52 to device 54. As illustrated in FIG. 6, a control mechanism 62 preferably includes a wireless transmitter 63 that is set up in the region to be put in a quiet mode, and each of the compatible devices 65 may include a wireless receiver 64 that causes the device to be put into a low volume (in which audible alert are set to a low volume) or silent mode (in which audible alerts are turned off and only mechanical, electrical, or optical alerts are used) when a corresponding signal 66 is received from transmitter 63.

Figure 7:
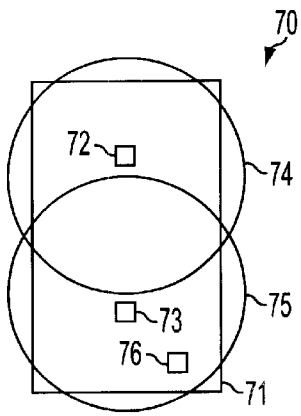
FIG. 7 is an illustration of an area covered by two control mechanisms for controlling personal electronic devices in accordance with an embodiment of the present invention.

For example, in one implementation of the invention, as shown in FIG. 7, a restaurant 71 may be set up with two low power radio transmitters 72 and 73 that output a signal sufficient to reach only persons inside and in the area immediately surrounding the restaurant's building as indicated by areas 74 and 75. Such an arrangement could be verified by the installer of the transmitters checking the amplitude of the signals at a given perimeter and adjusting the amplitude if necessary.

When a compliant cellular phone 76 that contains a receiver that is compatible with the restaurant's transmitters 72 and 73 enters either of areas 74 and 75 (as illustrated, area 75), the phone will receive a signal from the corresponding transmitter (as illustrated, transmitter 73) that causes the phone to enter a vibrate-only mode in which no audible alert is made to the user, or that causes the phone to enter some other suitable quiet mode.

Figure 8:
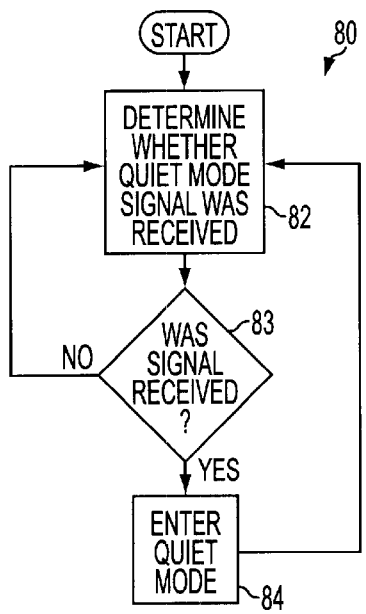
FIG. 8 is a flow diagram of a process for a personal electronic device in accordance with an embodiment of the present invention.

FIG. 8 illustrates a process 80 for a personal electronic device operating in accordance with one embodiment of the second aspect of the invention. As shown, at steps 82 and 83, process 80 determines whether a signal was received from a control mechanism transmitter. If a signal was not received, then process 80 loops back to step 82. Otherwise, process 80 causes the personal electronic device to enter a quiet mode at step 84. The quiet mode may be entered at step 84 for only a fixed period of time so that after the personal electronic device has been removed from the area containing the control mechanism for at least the fixed period of time, the personal electronic device will exit the quiet mode.

Figure 9:
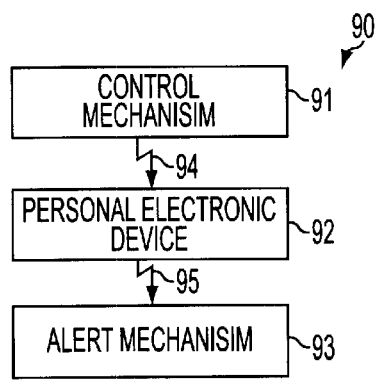
FIG. 9 is a block diagram of a control mechanism, a personal electronic device, and an alert mechanism in accordance with an embodiment of the present invention.

When the present invention is implemented in accordance with both the first and second aspects of the present invention, each of a control mechanism 91, a personal electronic device 92, and an alert mechanism 93 may be used as shown in FIG. 9. As illustrated, when device 92 comes within the range of a control mechanism 91, a signal 94 may be received and cause device 92 to enter a quiet mode. When an event subsequently occurs in device 92, the device may determine that it is in a quiet mode and correspondingly transmit a signal 95 to alert mechanism 93. The alert mechanism may then alert the user of the occurrence of the event.

It will be understood that the foregoing is only illustrative of the principles of the invention and that various modifications can be made by those skilled in the art without departing from the scope and spirit of this invention, which is limited only by the claims that follow.

What is claimed is:

1. A personal electronic device control system comprising:
   a control mechanism that at least periodically transmits a wireless control signal that covers a given area irrespective of an occurrence of an event; and
   a personal electronic device that includes a receiver that receives the wireless control signal when the personal electronic device is in the given area, that enters a quiet mode in response to the wireless control signal being received, and in which the occurrence of the event takes place.

2. The personal electronic device control system of claim 1, wherein the control mechanism transmits the wireless control signal as a radio frequency signal.

3. The personal electronic device control system of claim 1, wherein the personal electronic device vibrates when in the quiet mode.

4. The personal electronic device control system of claim 1, wherein the personal electronic device transmits a wireless signal to an alert mechanism when both in the quiet mode and an event occurs.

5. A method for controlling and alerting a user to an event in a personal electronic device, comprising:

transmitting a wireless control signal that covers a given area at least periodically irrespective of an occurrence of the event;

receiving the wireless control signal when the personal electronic device is in the given area;

putting the personal electronic device into a quiet mode when the wireless control signal is received;

transmitting a wireless alert signal when the event occurs in the personal electronic device;

receiving the wireless alert signal transmitted from the personal electronic device; and alerting the user that the event has occurred when the wireless alert signal is received.

* * * * *